United States Patent [19]

Lee

[11] 4,143,311
[45] Mar. 6, 1979

[54] HYSTERESIS SYNCHRONOUS MOTOR RATE SERVO SYSTEM

[75] Inventor: Dennis Lee, Pasadena, Calif.
[73] Assignee: Xerox Corporation, Stamford, Conn.
[21] Appl. No.: 728,091
[22] Filed: Sep. 30, 1976
[51] Int. Cl.² ............................................... G05B 5/01
[52] U.S. Cl. .................................... 318/611; 318/702; 318/448
[58] Field of Search ............... 318/307, 314, 313, 611, 318/166, 184, 167, 448

[56] References Cited
U.S. PATENT DOCUMENTS

| | | | |
|---|---|---|---|
| 3,559,018 | 1/1971 | Fournier | 318/314 |
| 3,600,508 | 8/1971 | Dann et al. | 318/314 |
| 3,600,657 | 8/1971 | Pfaff | 318/314 |
| 3,668,492 | 6/1972 | Konishi et al. | 318/314 |
| 3,829,747 | 8/1974 | Woolfson et al. | 318/314 |
| 3,887,853 | 6/1975 | Klein et al. | 318/307 |

Primary Examiner—David Smith, Jr.
Attorney, Agent, or Firm—Irving Keschner; Franklyn C. Weiss

[57] ABSTRACT

A servo control system for maintaining a direct current motor in operation at a constant speed is provided with two velocity feedback control loops. One feedback control loop is a rate damping loop which responds quickly to minor variations in motor speed to hold the motor at a predetermined command speed. The other loop is a steady state error loop through which a command speed is fed and which responds much more slowly to variations in command speed. The utilization of dual velocity control loops allows the servo system to adjust motor speed quickly in response to deviations in actual motor speed from commanded speed, yet is sensitive to low frequency variations in velocity feedback such as result from disturbances in motor loading.

6 Claims, 5 Drawing Figures

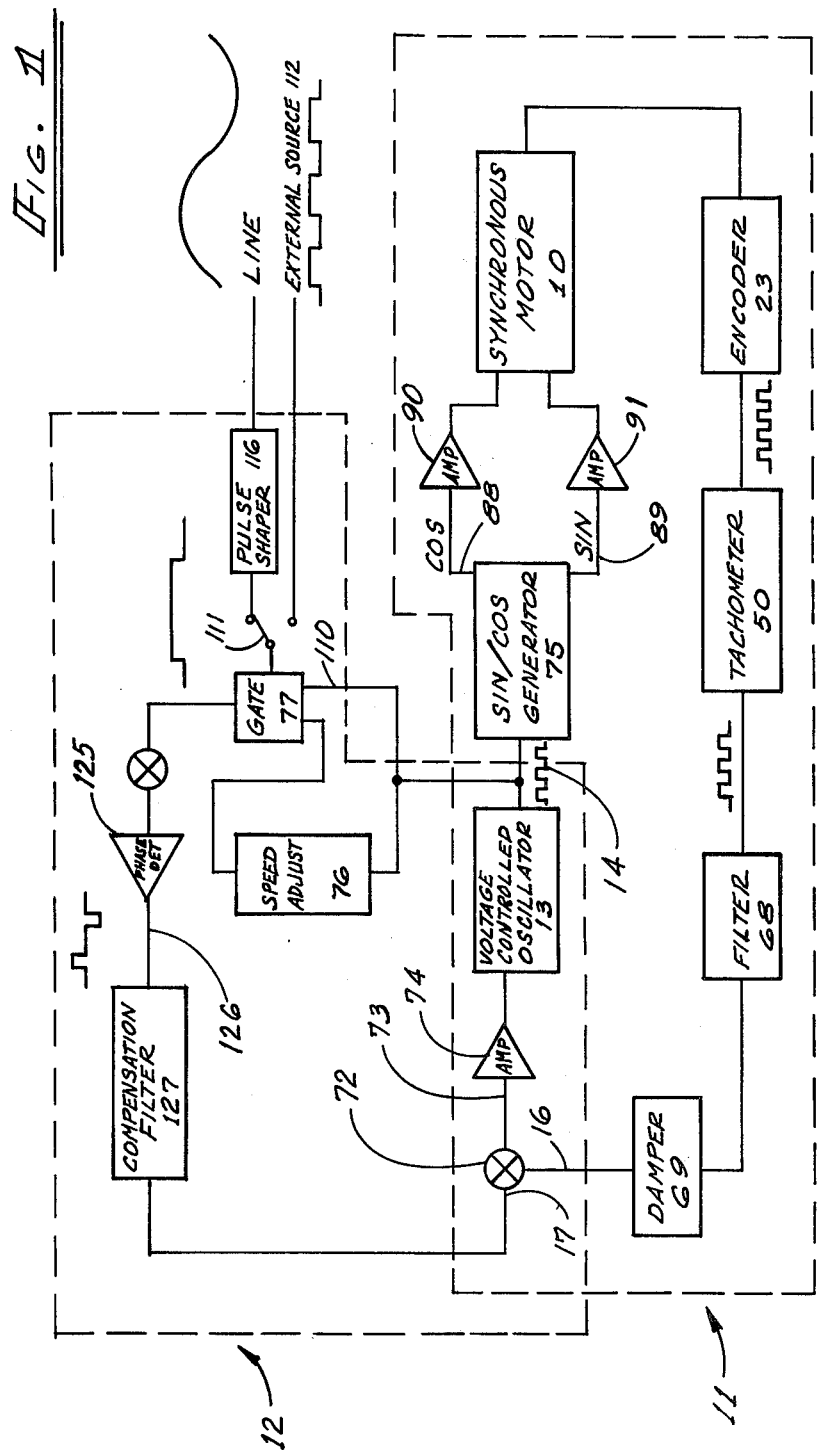

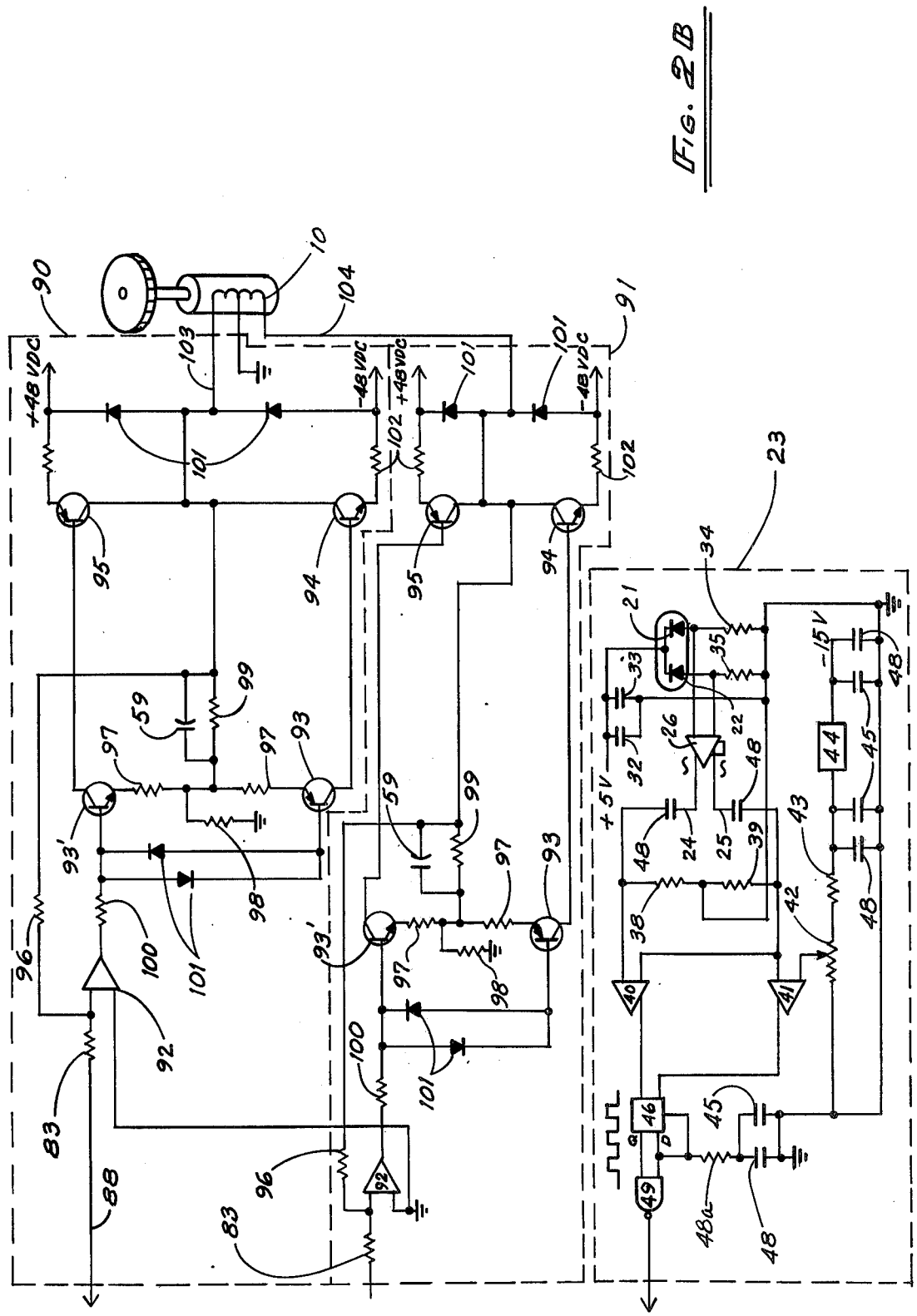

HYSTERESIS SYNCHRONOUS MOTOR RATE SERVO SYSTEM

FIELD OF THE INVENTION

The present invention relates to servo control systems for driving direct current hysteresis synchronous motors at a predetermined constant velocity.

BACKGROUND OF THE INVENTION

In many applications it is highly desirable to maintain the speed of a motor driven by direct electrical current at a constant value with a high degree of precision. The precise control of motor speed typically dictates the use of a servo feedback control loop for regulating motor speed. That is, a signal indicative of actual motor speed is derived from the turning shaft of the motor and is combined with a reference speed signal to command the motor to move at a precise rate. Thus, a means of compensation is provided for drift in amplifying signals which occur in electrical components. Such drifting of amplifying signals may be caused by temperature changes, component aging, or humidity. The use of a servo feedback control allows the motor speed to be held to a commanded value in a system which responds immediately to minor deviations from this value.

Synchronous motors are used in applications where highly precise control of speed is necessary. In synchronous motors, the rotor of the motor is designed to "lock" at a synchronous speed and maintain that speed under all normal loading conditions. Hysteresis type synchronous motors maintain their speed within precise limits, but are quite expensive and are sensitive to voltage changes.

Hysteresis types sychronous motors exhibit a mode of oscillation called hunting. Hunting usually occurs in the frequency range from 1 to 4 hertz and remains as a lingering effect on motor operation some time after the establishment of a change in commanded motor speed. The degree of error in speed of motor rotation that results from hunting produces results that are unacceptable in many devices. For example, in laser beam printing machines in which a laser beam is directed at a rotating polygonal mirror to effectuate a reproduction of printed or illustrated material, rotation of the polygonal mirror at an absolutely constant speed is critical. However, in existing systems the motors utilized to rotate the polygonal mirror are subject to the effects of hunting with the result that copy quality produced from these printers is degraded well below an acceptable level whenever motor load is disturbed. The degradation of quality manifests itself as a wavy print on the copy at the hunting frequency. That is, a line which should be reproduced as a straight line is reproduced having a wavy configuration. The inducement of hunting of a hysteresis synchronous motor may result from one of a number of causes, but frequently occurs as a result of initially bringing the motor up to speed or changing motor speed.

Accordingly, it is a principal object of the present invention to provide a servo control system for a direct current motor that is insensitive to those influences that lead to hunting in conventional synchronous motors. This is achieved by providing the motor with dual control loops. One of the control loops renders the system extremely sensitive to variations in actual motor speed, so that the speed of the motor is not allowed to drift. The other control loop renders the motor insensitive to temporary fluctuations of lower frequency in motor loading.

A further object of the invention is to provide a servo control system for a synchronous motor in which the reference speed signal is provided from a 60 hertz alternating current power line. This allows the synchronous motor to be referenced to a common line frequency with other components of an equipment system, such as other motors. Thus, changes which occur in the 60 hertz line frequency effect all of the system components, uniformly, thus minimizing resulting adverse effects.

A further object of the invention is to provide a servo control system utilizing a plurality of control loops. This decreases the complexity of the servo control system from conventional devices, which typically use some form of phase locking technique to both dampen and regulate the shaft speed of the motor. In such conventional systems the cost of implementing the servo loop increases with increasing complexity. Simplicity is achieved in the present invention, however, by utilizing two loops.

DESCRIPTION OF THE DRAWINGS

FIG. 1 is a block diagram of the servo control system according to the invention.

FIGS. 2A and 2B are complementary portions of a schematic diagram of the servo control system of FIG. 1.

DETAILED DESCRIPTION

Figure 2A:
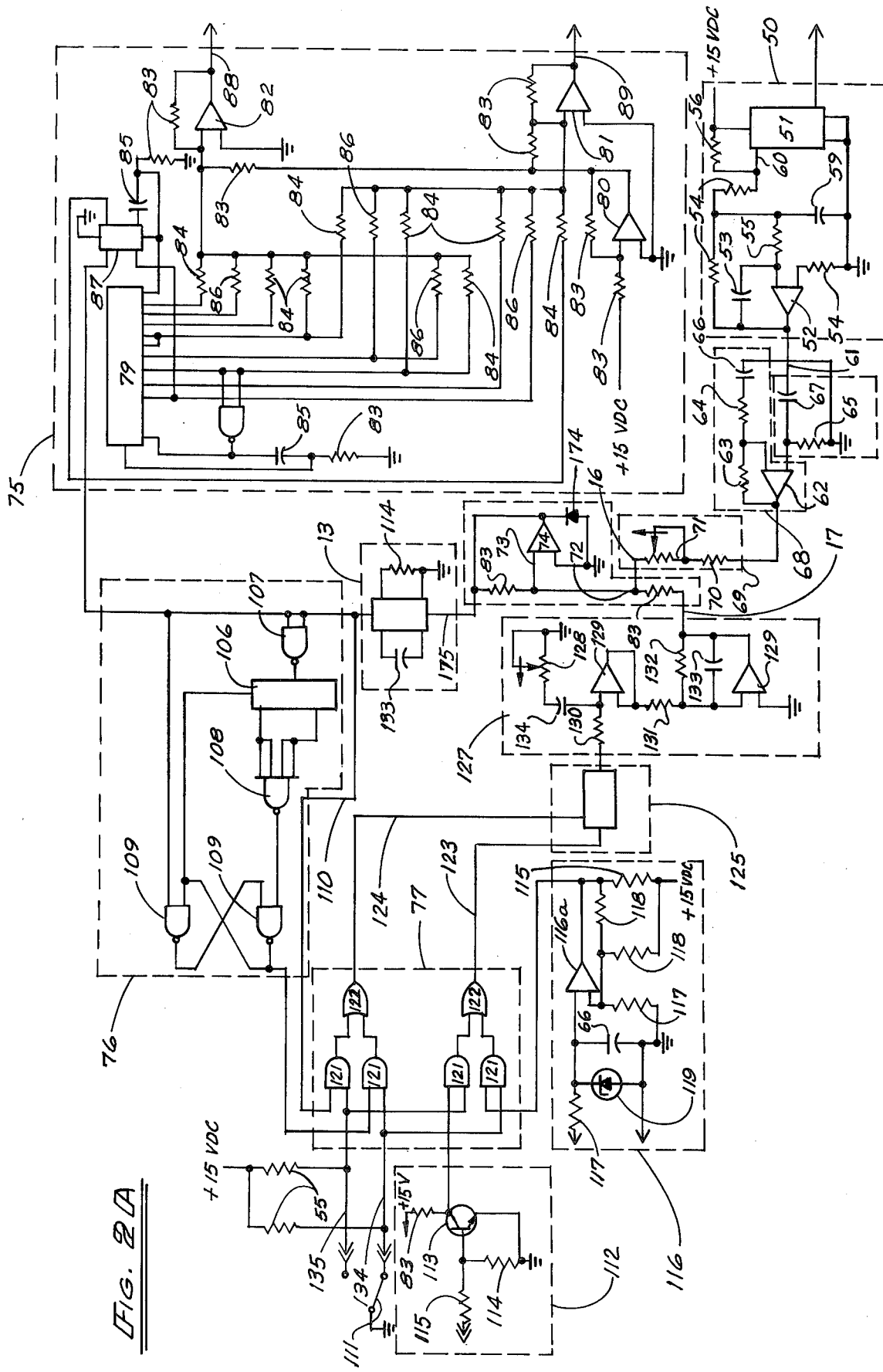

A velocity feedback servo control system is depicted in FIG. 1. The control system of FIG. 1 maintains a hysteresis type direct current synchronous motor 10 in operation at a constant speed. Two velocity control loops are provided in the servo control system of FIG. 1. One loop is a rate damping feedback loop 11 while the other is a steady state error loop 12. Both of the loops 11 and 12 utilize a common voltage controlled oscillator 13 for providing control signals as indicated at 14 to the motor 10 at a frequency responsive to signals from all of the velocity controlled loops.

The voltage controlled oscillator 13 is one-half of an intergrated circuit and operates to regulate the motor 10 to maintain the angular rotation of the shaft 15 of the motor 10 at a constant speed. The frequency of the pulse train 14 provided at the output of the voltage contolled oscillator 13 varys in accordance with the sum of a velocity feedback signal at 16 and a difference signal at 17 that represents the phase difference between a previous output of the velocity controlled oscillator 13 and a commanded motor speed. The frequency of the pulse train 14 regulates the angular speed of the shaft 15 of motor 10 to drive the shaft 15 at a constant speed. The pulses of the pulse train 14 are also used for feedback pulses for the steady state error loop 12. Differences in frequency of the voltage controlled oscillator 13 for different devices are not important, since the steady state feedback loop 12 encloses the voltage controlled oscillator 13. Also, any changes in voltage controlled oscillator frequency due to temperature variations are compensated.

Figure 3:
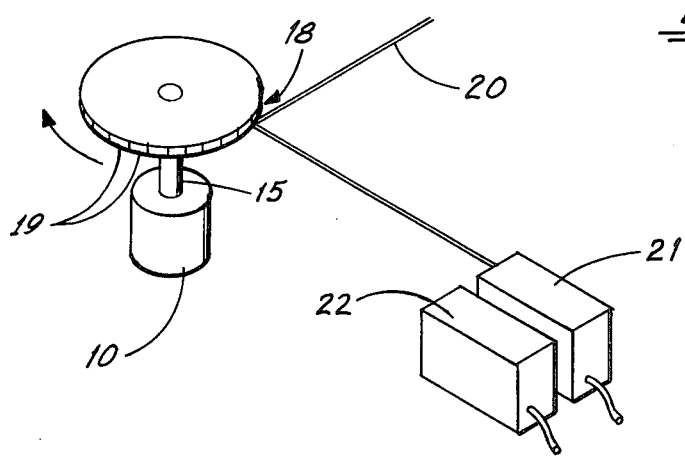
FIG. 3 illustrates the operation of the encoder of FIG. 1.

One application of the motor 10 is in a laser beam printing unit, and is depicted in FIG. 3. A polygonal mirror 18 having, for example, 36 rectangular faces 19 is mounted directly on the shaft 15 of the synchronous motor 10. By directly coupling the mirror 18 to the shaft, the system avoids excessive torque ripple which can result from the use of excessive mechanical coupling components.

Figure 4:
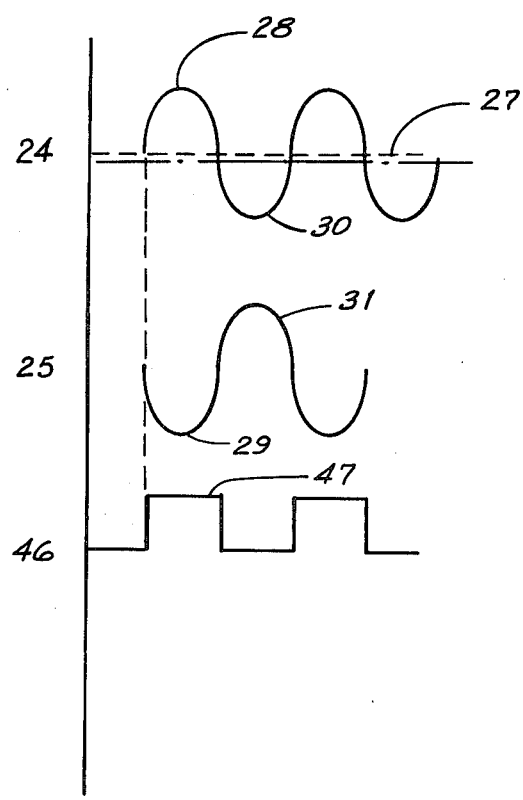
FIG. 4 depicts wave forms developed with the encoder of FIG. 3.

A laser beam 20 is directed at the mirror 18 and is successively reflected off the faces 19 of the mirror 18 as the shaft 15 rotates. As a face 19 moves into alignment with the laser beam 20, the laser beam 20 is swept transversely across photocell units 21 and 22 that together form the photosensitive elements of the encoder 23. The encoder is of a special design which uses a split detector arrangement to exactly determine the crossover point of the laser beam 20 independent of ambient lighting conditions and laser beam intensity fluctuations. The encoder 23 processes the scanning laser beam 20 into an electrical signal for use in the electronic tachometer 50. As the laser beam 20 first strikes the first part of the detector, the photocell 21, it produces opposing cyclical output signals on the leads 24 and 25 of the video amplifier 26. These signals are indicated conceptually in FIG. 2B and in greater detail in FIG. 4. Initially, the signal at output lead 24 rises until it achieves a threshold level 27 as indicated in FIG. 4. The signal at 24 continues to rise until it reaches a maximum value as indicated at 28 in FIG. 4. At this time the opposing signal at 25 is at its minimum value 29. The time at which the peaks 28 and 29 are achieved corresponds to the moment that the beam 20 is focused directly on the photocell 21. As the beam 20 leaves the photocell 21 and progresses toward the photocell 22, the voltage at lead 24 falls while the voltage at lead 25 of video amplifier 26 rises until the reverse peaks 30 and 31 are produced as indicated in FIG. 4. The laser beam 20 then leaves the photocell 22. The signals are repeated when a new face 19 of the mirror 18 begins to arrive in alignment with the beam 20. Thus the signals at leads 24 and 25 are of cyclic nature.

The photocells 21 and 22 are connected to a power supply of plus five volts which is stablized by capacitors 32 and 33 connected to ground as indicated in FIG. 2B. The anodes of the photocells 21 and 22 are respectively connected to ground through resistors 34 and 35. Damping capacitors 48 are connected to output leads 24 and 25 respectively of video amplifier 26. Resistors 38 and 39 hold the leads 24 and 25 at a predetermined voltage differential with respect to ground. The leads 24 and 25 form input connections with a zero cross over detection amplifier 40. The lead 25 is also connected to one input of a threshold detection amplifier 41. The other input to the amplifier 41 is derived from a potentiometer 42 coupled through a resistor 43 to a stablized minus five volt supply 44. The stablized direct current voltage at 44 is derived from a −15 volt power supply which in turn is stablized to ground by capacitors 45 and 48.

Amplifier 41 produces an output when the signal at lead 24 reaches the threshold level indicated at 27 in FIG. 4. The output of threshold detector 41 serves as clock pulse to a flip-flop curcuit 46 that emits a pulse as indicated at 47 in FIG. 4. The pulse 47 continues on the Q output of flip-flop 46 until after the signals at leads 24 and 25 have achieved voltage peaks of opposing polarity at 28 and 29 respectively and have declined to where the outputs at 24 and 25 are equal. When the signals are equal, a zero cross over condition exists which produces an output of the zero cross over detection amplifier 40. The output of amplifier 40 clears the flip-flop 46 and returns the Q output of flip-flop 46 to the low condition. A resistor 48d and capacitors 45 and 48 stablize one input to the pulse shaping NAND gate 49, the other input of which is coupled to the Q output of flip-flop 46.

The circuitry of the encode 23 reacts to the manipulation of the optical beam 20 by the motor 10 to generate a squarewave position pulse 47 in FIG. 4 at the Q output of flip-flop 46 in which the leading edge of each position pulse is produced from at least one of the photocells 21 and 22 at a prequisite threshold 27 of beam intensity. The trailing edge of the position pulse 47 is produced from the photocells 21 and 22 when the outputs therefrom are equal. The NAND gate 49 merely serves to further square the pulse 47. In this way the position signals 47 are generated with predetermined increments of rotational advancement of the shaft 15 by the motor 10. The frequency of the position signals 47 varies with the actual momentary speed of the motor 10.

Coupled to the encoder 23 is an electronic tachometer 50. The tachometer 50 includes two major components; a one shot monostable multivibrator 51 and a filter including a amplifier 52 and a capacitor 53. The one shot multivibrator 51 is triggered each time the laser beam 20 crosses the detector and produces a pulse of fixed duration. The average voltage from the one shot depends on the repetition frequency of the triggering pulses. The filter removes the harmonic content of the output of the one shot 51 and thereby reduces ripple. Resistors 54, 55, 56 and 57 and capacitors 58 and 59 serve to complete the structure of the tachometer 50 as indicated in FIG. 2A. The output of the monistable multivibrator 51 at 60 is a pulse of constant width produced at a frequency that varies with the speed of rotation of the shaft 15. The filtered output of the tachometer 50 appears at 61 as a voltage level of a magnitude proportional to the frequency of the position signal 47. This voltage output at 61 is further filtered by a compensating filter network 68 including an amplifier 62, resistors 63, 64, and 65 and capacitors 66 and 67. The resulting signal is dampened by a loop gain adjustment network 69 including a resistor 70 and a potentiometer 71. The signal provided at 16 is thereby a direct current level representative of the actual speed of rotation of the shaft 15 of the motor 10.

The actual velocity signal 16 is combined with the steady state error signal 17 at the summing node 72. The resultant signal 73 is a direct current voltage level that is fed to an operational amplifier 74 which is connected with a feedback resistor 83 and a clamping diode 76 to operate in the summing mode as an error amplifier between the damping loop 11 and the steady state error loop 12. The output of the operational amplifier 74 is fed as a amplified direct voltage level at 75 to the voltage control oscillator 13. As previously indicated, the output of the voltage controlled oscillator 13 is the motor drive signal 14.

The pulse train 14 is fed both to a sin/cos generator 75 and to a speed adjustment circuit 76 as well as an AND/OR gating system 77. The output from the voltage controlled oscillator 13 is transmitted on line 78 as clocking pulses to a shift register 79 within the sin/cos generator 75. The sin/cos generator 75 converts the clock pulses in the pulse train 14 generated by the voltage controlled oscillator 13 into digitally synthesized sine and cosine wave forms. This technique allows a constant 90° phase shift to be generated between the two wave forms regardless of the frequency of operation. In addition to the shift register 79, the sin/cos generator 75 includes amplifiers 80, 81 and 82 resistors 83, 84 and 86, capacitor 85, and a flip-flop circuit 87. The output of the amplifier 82 is the cosine signal which appears on the circuit 88 while the output of the amplifier 81 is the sine signal which appears on the circuit 89. These signals are respectively passed to power amplifiers 90 and 91.

The power amplifiers 90 and 91 increase the level of the sine and cosine waveforms to an acceptable drive amplitude for the motor 10. Each of the power amplifiers 90 and 91 is comprised of an operational amplifier 92 transistors 93, 93', 94 and 95, resistors 83, 96, 97, 98, 99, 100 and 102, diodes 101, and capacitors 59 connected in the circuit arrangement shown in FIG. 2B. Plus and minus 48 volt direct current power supplies are provided to the circuitry as indicated in FIG. 2B. The outputs of the power amplifiers are fed to the windings of the synchronous motor 10 on leads 103 and 104.

The output of the voltage controlled oscillator 13 is also supplied to the speed adjustment circuit 76 and to the gate arrangement 77 as illustrated in FIG. 2A. The speed adjustment circuit 76 is a digital count down circuit whose dividing ratio is operator adjustable. In the embodiment of the invention depicted, it is desirable for the speed adjustment circuit 76 to divide by 18. That is, a pulse is produced on output line 105 from the adjustment circuit 76 for each 18 pulses transmitted to the circuit 76 by the voltage controlled oscillator 13. The speed adjustment circuit 76 includes a counter 106 which is pulsed through a NAND gate 107, the leads of which are tied together. The degree of adjustment is manipulated by the manner in which the output lines of counter 106 are connected to the inputs of a second NAND gate 108. Further gating is achieved through the pair of NAND gates 109 connected as indicated in FIG. 2.

The output of the voltage controlled oscillator 13 is likewise connected by line 110 directly to the gating system 77. Thus, the gating system 77 receives inputs both from lines 105 and 110. A manual switch 111 is operable to connect a reference signal as a command velocity to the system, either from a 60 hertz line frequency current source or from an external source input. One instance in which an external frequency source input might be utilized is when it is desired to operate the motor 10 under computer control. In this instance the pulses supplied by the external source are squarewave pulses as depicted near the designation external source 112 in FIG. 1.

A transistor 113 and resistors 83, 114 and 115 are utilized to square pulses from the external source 112. Since these would normally be digital pulses, only minor reshaping is necessary. In contrast, however, when the 60 cycle line current pulses are to be employed as a means for deriving the command velocity signal, they must be reshaped in the pulse shaping network 116A. This network includes an operational amplifier 116, resistors 115, 117 and 118 and a rectifier 119. The output of the pulse shaping network 116 is fed to the gating system 77 on line 120 as a squarewave pulse train of a relatively low frequency.

In the gating arrangement 77, signals from the speed adjustment network 76, from the voltage controlled oscillator 13, and from the pulse shaping network 116 and external frequency source 112 are gated in the manner depicted in FIG. 2A by AND gates 121 and OR gates 122. Signals are transmitted from the gating arrangement 77 on both the lines 123 and 124 responsive to either the external source or line source depending upon the position of the manual switch 111.

In either event, the output of the gating system will be passed to a phase detector circuit 125. The phase detector circuit 125 may be provided as the other half of the intergrated circuit chip containing the voltage controlled oscillator 13. The pulse detector 125 compares the phase of the speed adjustment network 76 and that of the reshaped pulses from the 60 cycle line frequency when connected in the manner depicted in the drawings. The phase detector 125 then produces an output error voltage at 126 proportional to the difference in phase between the two input signals. That is, if there is no phase differential between the line frequency and the output of the voltage controlled oscillator 13, there will be a zero error signal. Normally, however, there is some slight phase differential which results in pulses of narrow width appearing for the duration of the nonconcurrence of input signals to the phase detector 125. The width of these pulses at 126 represents the degree of phase differential. If the switch 111 is in the opposite position there is a comparison of phase differential between the external source and the direct output from the voltage controlled oscillator 13.

The output at 126 from the phase detector 125 is supplied to a compensation filter 127, the purpose of which is to regulate the speed of response of the steady state error loop 12 and also to provide damping for that loop. This is achieved through the utilization of a potentiometer 128 operational amplifiers 129, resistors 130, 131 and 132 and capacitors 133 and 134. The resulting output of the compensation filter 127 appears at line 17 and is the steady state error signal which is a direct current voltage. Thus, the command speed appears at the signal sensing gating circuit 77 from the switch 111. The gating circuit 77 combines the motor drive signal on line 110 from the voltage controlled oscillator 13 with the command velocity signal as a pulse train at a reference frequency. This differential output from the gating system 77 is passed to the phase detector 125 to generate an error signal at 126 as a pulse train in response to phase differences between the command velocity signal and the motor drive signal at 110. The compensating filter 127 is connected to the output of the phase detector 125 and converts the pulse train error signal at 126 to a direct voltage steady state error signal at 17. The compensating filter 127 also controls the response time and damping of the steady state error loop 12.

The system described is a servo control system having rate feedback. If differs from most other servo loops which utilize a hystersis synchronous motor in that conventional systems employ some form of phase locking technique to both dampen and regulate the shaft speed of the motor. This results in undue complexity and cost of implementing the servo loop. In the system depicted in the drawings of the present invention, however, simplicity is achieved by utilizing two loops.

Other features of the embodiment of the invention depicted include the capability for referencing the speed of the motor 10 to a 60 hertz line frequency. This couples the motor speed to the speed of other components of a printing system by virtue of the fact that these other components are also referenced to the 60 hertz line frequency via other synchronous motors. Hence any changes in speed due to changes in line frequency are compensated for by the servo motor controls. This method of servo tracking reduces the cost and complexity over other systems which utilize an encoder on other rotating system components to regulate the steady state speed of the servo motor, such as the motor 10. Thus, the steady state speed of the motor 10 in the present invention is as precise as that of the 60 hertz line frequency. Speed adjustment is exact by virtue of the digital count down speed adjustment circuit 76 and errors as might occur in analog circuits do not exist.

Damping adjustments between the two feedback loops 11 and 12 are completely independent of one another. This reduces set up time and hence cost, during production runs of a printer system employing the servo system of the present invention.

The hystersis synchronous motor is not a part of the steady state feedback loop, and hence, the order of the loop is decreased by one. This reduces complexity greatly and therefore also reduces cost. Despite the fact that the motor 10 is not part of the direct current feedback loop 12, it follows a sub-multiple of the output 14 of the voltage controlled oscillator 13 by virtue of its synchronous action. The phase difference of the driving signals for the motor are maintained at a constant 90° regardless of operating frequency by virtue of the power amplifiers 90 and 91. This lends flexibility to the system as opposed to analog systems where different phase compensating elements must be switched in and out of the loop for various operating frequencies.

Low voltage operational amplifiers are used in power amplifiers 90 and 91 along with transistors to produce an ouput 70 volts peak to peak. A double feedback loop is used to increase the input signal and to provide desensitivity to temperature changes. A single capacitor 59 is also provided for lead compensation.

The foregoing detailed description of the particular embodiment of the invention depicted should not be considered as limiting, but rather the invention is defined in the claims appended hereto.

I claim:

1. In a velocity feedback servo control system for maintaining a direct current hysteresis synchronous motor in operation at a constant speed, the improvement comprising the provision of at least two velocity control loops in which one loop is a rate damping loop which is responsive to the variations of speed of said motor from said constant speed and compensates for said variations and the other loop is a steady state error loop which is responsive to a commanded motor speed for adjusting the motor speed to be substantially equal to said commanded motor speed, said operating constant speed being substantially equal to said commanded motor speed, and in which both loops utilize a common voltage controlled oscillator for providing control signals to said motor at a frequency responsive to signals from all of said velocity control loops, said control signal from said voltage controlled oscillator being phase locked to said commanded motor speed, the response of said steady state error loop being substantially independent of said motor speed variations.

2. The velocity feedback control system of claim 1 further characterized in that said voltage controlled oscillator provides a pulse train at a frequency that varies in accordance with the sum of a velocity feedback signal and the difference between a previous output of said voltage controlled oscillator and said commanded motor speed.

3. In a servo control system for maintaining a direct current hysteresis synchronous motor in operation at a constant speed, the improvement comprising the provision of at least two velocity control loops governing the speed of operation of said motor wherein one of said loops is a rate damping feedback loop which is responsive to the variations of speed of said motor from said constant speed and compensates for such variations, including an encoder to generate position signals with predetermined increments of rotational advancement of said motor, signal conversion means for converting said position signals to a direct current voltage level of a magnitude proportional to the frequency of said signals, voltage controlled oscillation means for generating pulses at a frequency proportional to an input voltage level, signal conversion means responsive to said voltage controlled oscillation means for providing signals of uniform relative phase displacement at a frequency governed by the rate of generation of pulses in said voltage controlled oscillator to drive said motor at a speed proportional to said frequency of pulses from said voltage controlled oscillation means, and wherein another of said loops is a steady state error loop including said voltage controlled oscillation means, a reference signal source of pulses at a reference frequency, error signal generating means for receiving pulses from said reference signal source and from said voltage controlled oscillation means and for generating a direct current voltage level output error signal proportional to the phase difference therebetween, the pulses from said voltage controlled oscillation means being phase locked to said reference source of pulses, and said signal summing means for combining said error signal and said direct current voltage proportional to said position signals and for providing said input to said voltage controlled oscillator, the response of said steady state error loop being substantially independent of said motor speed variations.

4. In a velocity feedback servo control system for maintaining a direct current hysteresis synchronous motor in operation at constant speed the improvement comprising at least two velocity control loops for providing a motor drive signal to govern the speed of operation of said motor including a rate damping feedback loop for providing an actual velocity signal indicative of momentary actual velocity, a steady state error loop for providing a steady state error signal indicative of the phase difference between a command velocity signal and the prior motor drive signal, the response of said steady state loop being substantially independent of said momentary actual velocity signal, a voltage controlled oscillator for generating said motor drive signal in the form of a variable frequency pulse train in response to the combination of said actual velocity signal and said steady state error signal, signal conversion means connected to said voltage controlled oscillator and responsive thereto to provide a pair of cyclical voltages to said hysteresis synchronous motor phase displaced from each other to a predetermined degree and varying in frequency in response to the output of said voltage controlled oscillator, signal sensing means for combining said motor drive signal from said voltage controlled oscillator with a command velocity signal in the form of a pulse train at a reference frequency and phase detector means for generating an error signal as a pulse train in response to phase differences between said command velocity signal and said motor drive signal.

5. The apparatus of claim 4 further comprising gate means interposed between said signal sensing means and said voltage controlled oscillator for alternatively providing a sinusoidal alternating current line signal or a cyclical digital signal as said command velocity signal.

6. The apparatus as defined in claim 5 wherein said gate means alternately couples said cyclical digital signal and the output of said voltage controlled oscillator or said alternating current line signal and a pulse train signal having a frequency equal to the frequency of said voltage controlled oscillator divided by an integer to said signal sensing means.

* * * * *